J. C. SHAW.
APPARATUS OR PLANT FOR CHILLING AND FREEZING ANIMAL SUBSTANCES.
APPLICATION FILED MAR. 11, 1920.

1,422,628.

Patented July 11, 1922.

Witness
Chas. Wendale

Inventor:
John Coutts Shaw.

J. C. SHAW.
APPARATUS OR PLANT FOR CHILLING AND FREEZING ANIMAL SUBSTANCES.
APPLICATION FILED MAR. 11, 1920.

1,422,628.

Patented July 11, 1922.

Witness:
Chas. Wendale.

Inventor:
John Coutts Shaw.

UNITED STATES PATENT OFFICE.

JOHN COUTTS SHAW, OF PRETORIA, TRANSVAAL, SOUTH AFRICA.

APPARATUS OR PLANT FOR CHILLING AND FREEZING ANIMAL SUBSTANCES.

1,422,628. Specification of Letters Patent. Patented July 11, 1922.

Original application filed September 5, 1918, Serial No. 252,772. Divided and this application filed March 11, 1920. Serial No. 365,112.

*To all whom it may concern:*

Be it known that I, JOHN COUTTS SHAW, a subject of the King of Great Britain, and resident of Pretoria, Transvaal Province, Union of South Africa, have invented certain new and useful Improvements in Apparatus or Plant for Chilling and Freezing Animal Substances, of which the following is a specification.

This invention appertains to apparatus or plant for chilling and freezing animal substances, such as the carcasses of slaughtered oxen, sheep or other animals, poultry and other birds, et cetera, and is a division of application Serial No. 252,772, filed 5th September, 1918.

In plant for carrying out the ordinary processes of refrigeration, the meat is placed in the cooling or chilling chamber of the plant, and, after the chamber has been closed, the air therein contained, together with the vapours, fumes or exhalations issuing or emanating from the meat, are continuously withdrawn from the chamber and brought into contact with the cooling means, and then returned to the chamber. In this way the air is repeatedly returned to, or continuously circulated through, the chamber, until the initial cooling or chilling of the meat is completed, during which process the air in circulation continues to be charged or impregnated with the vapours or exhalations given off by the meat in the carrying out of the process.

I find that during this stage of the process the meat remains in a soft and moist condition, which I ascribe to the presence in the air, which is being circulated, of the vapours or exhalations from the meat, and out of which vapours or exhalations a deposit is formed on the surface of the meat.

Now according to this invention the apparatus or plant is so designed that the chilling or cooling of the meat is commenced under a partial vacuum, or carried out in a chamber in which the air pressure is reduced or brought below that of the atmosphere, by partially exhausting the air from said chamber. Whilst the meat is in the chamber under a partial vacuum, the temperature within the said chamber is reduced, preferably through the medium of the direct expansion system operating in the chamber. The vapours, fumes or emanations arising from the meat in the chamber during the process of chilling are immediately withdrawn from the chamber by the means provided for creating the partial vacuum therein, and said vapours, fumes or emanations are not returned to the chamber, as at present. A portion of the vapours, fumes or emanations will be condensed or frozen on the surface of the direct expansion pipes inside the chamber.

After the initial chilling of the meat has been carried out to the requisite extent in the manner explained, then further chilling of the meat (if necessary) may be carried out in the ordinary manner by cold air circulation.

After the initial chilling in the partial vacuum, or the further chilling by cold air circulation, then the final freezing of the meat may be done either by direct expansion or by brine circulation, preferably in the same chamber as that in which the initial chilling and further chilling (if any) have been accomplished.

As a result of the chilling of the meat in the manner explained, the surface of the meat is dried, which prevents the nutritious contents of the meat from exuding and escaping during the subsequent stages of completing the chilling of the meat (if it be further chilled) and the freezing thereof; further, it prevents or minimizes the loss of such nutritious contents during the process of de-frosting or thawing. Meat chilled and frozen according to the method described retains its "bloom," and it has the flavour and appearance of freshly killed meat when it is de-frosted. Meat which has become discoloured through incipient decomposition is restored to its original colour.

In the accompanying drawings I illustrate, more or less diagrammatically, an apparatus or plant embodying the present invention.

In the drawings

Figure 1:
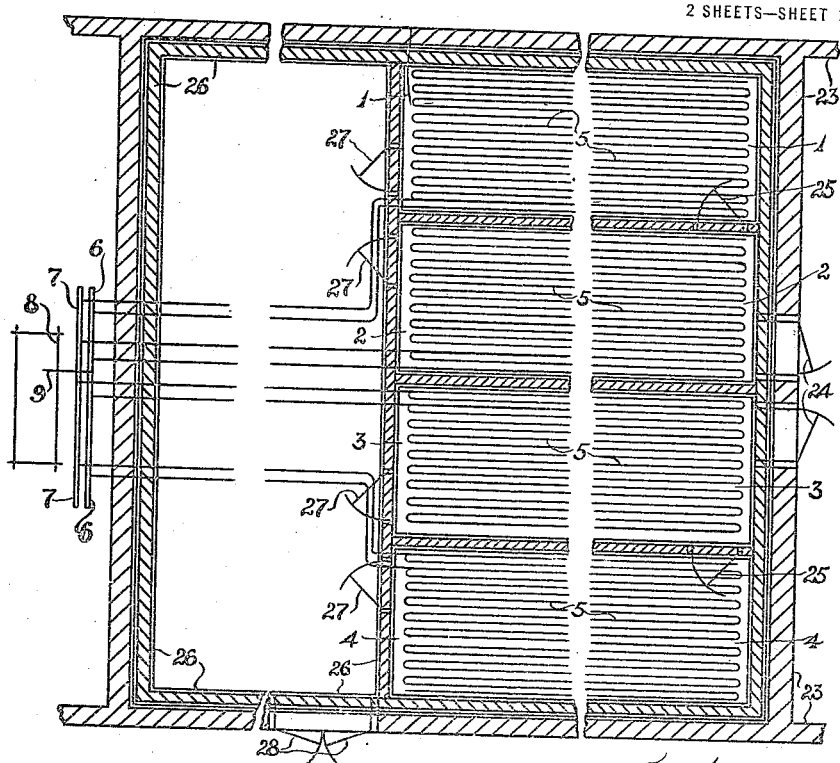
Fig. 1 is a sectional plan of the plant taken through the chilling and freezing rooms or chambers.

The apparatus or plant may be constructed to provide one or any desired number of the chilling and freezing rooms or chambers. In the particular arrangement shown in the drawings it comprises four of such rooms or chambers 1, 2, 3, 4, and each chamber is provided independently with the arrangement of pipes 5 for reducing the temperature of the same by the direct expansion system. The pipes 5 for the several chambers 1, 2, 3, 4, may, as shown, communicate with common suction and expansion headers 6, 7, and the former, as usual, be placed in communication with the ammonia compressor 8, by the pipe 9.

Centrally over the aforesaid chilling and freezing rooms or chambers 1, 2, 3, 4, a common air-cooling chamber 10 is provided, in which is arranged a battery of pipes 11, for cooling the air. This air-cooling battery 11, is connected with the suction and expansion headers 6, 7, respectively, like the direct expansion pipes 5, in the chilling chamber 1, 2, 3, 4.

The air-cooling chamber 10, communicates at its ends with passages 12, 13, extending above and along the ends of the several chilling and freezing chambers 1, 2, 3, 4. The passage 12 is adapted to be placed in communication with one end of each of the chilling and freezing chambers 1, 2, 3, 4, by one or more openings 14, which are fitted with doors or other means (not shown) for closing the same to said passage 12. In like manner the passage 13 can be placed in communication with the other end of each of the chambers 1, 2, 3, 4, by one or more openings 15, which are also fitted with doors or other means (not shown) for closing the same to said passage 13.

At the one end of the air-cooling chamber 10, or between said chamber and the suction passage 12, a suction fan 16 is provided. 17 represents a shaft on one end of which the fan 16 is fixed, 18 a support for the outer end of the shaft 17, 19 a pulley and 20 a belt for driving the shaft.

Figure 4:
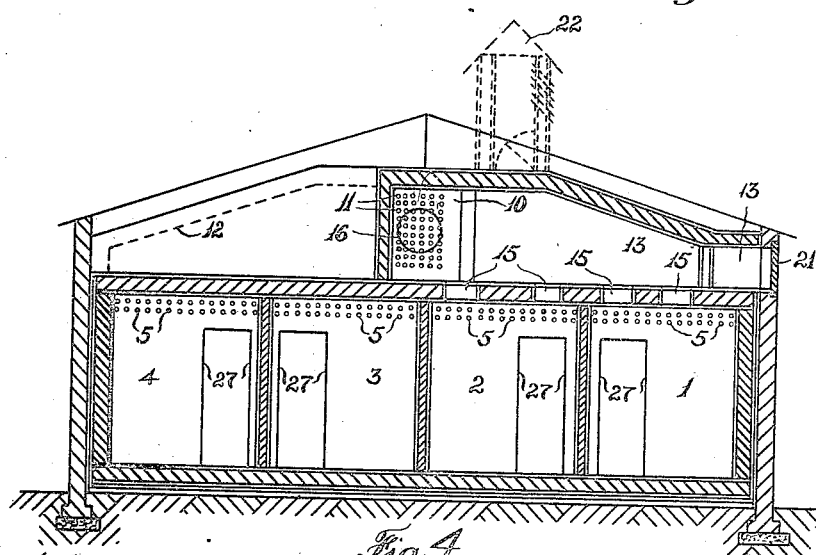
Fig. 4 is a sectional front elevation, partly through the outlet and delivery passage.
Figure 2:
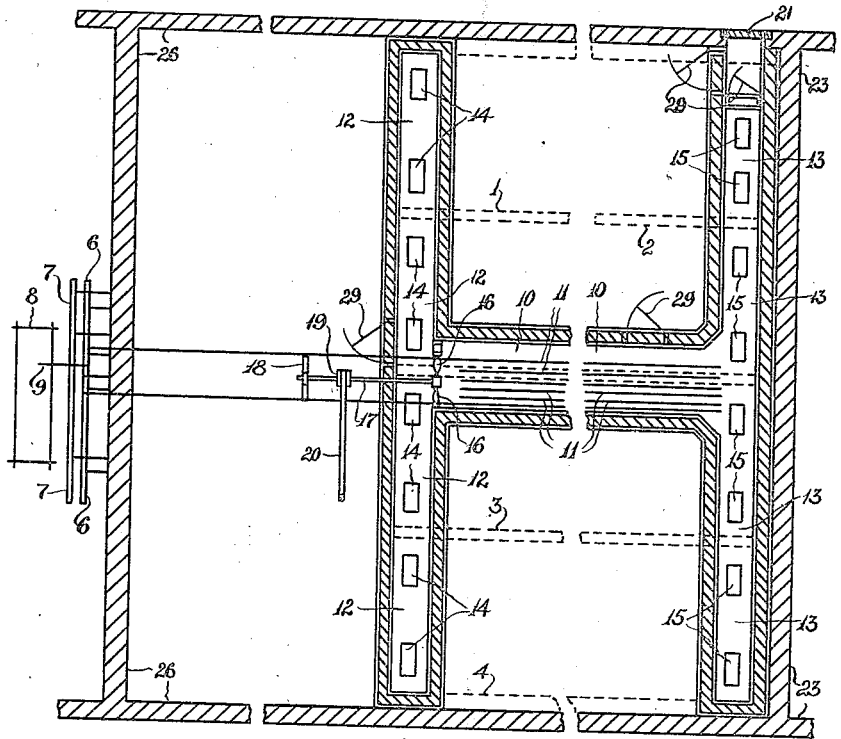
Fig. 2 is a sectional plan taken through the air-cooling chamber which is above the chilling and freezing rooms or chambers.
Figure 3:
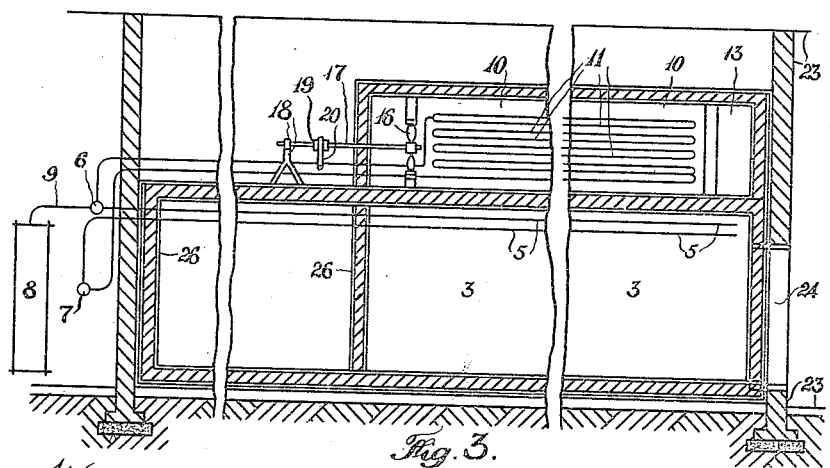
Fig. 3 is a sectional side elevation taken through the air-cooling chamber and the chilling and freezing rooms or chambers.

The fan 16 is adapted to be employed, firstly, for partially exhausting the air from each of said chilling chambers 1, 2, 3, 4, and discharging said air either directly or indirectly into the open; and, secondly, for circulating the air through the battery of pipes 11, in the air-cooling chamber 10, and thence through any of said chilling chambers 1, 2, 3, or 4. The outlet and delivery passage 13, with which the other end—the end remote from the fan 16—of the air-cooling chamber 10, communicates is, as shown, always open to said air-cooling chamber 10. This outlet and delivery passage 13, is provided with a door 21, or other means for opening and closing it to the external atmosphere. This outlet to the external atmosphere may be placed at one end of the passage 13, as shown, or as shown in dotted lines in Fig. 4, through a suitably positioned structure 22, in the roof or top of said passage 13.

A "hanging hall" or room 23 may be provided, as usual, for receiving the carcasses, and from which they will be transferred to the chilling chambers. Doors 24 may be provided leading from said hall or room 23 to each of the two centre chilling chambers 2, 3, and doors 25 be provided which give access from each of said central chilling chambers 2, 3, to the chilling chambers 1, 4, respectively, at the outer side of same. Suitable provision is made for effectively sealing or closing all entrance doors, to preclude, as far as possible the ingress of air into the chilling chambers 1, 2, 3, 4, when the process is in operation. Provision is also made for closing the aperture in the doors or walls through which the rails (if provided) pass from the hanging hall 23, to the chilling chambers 1, 2, 3, 4.

A storage room or chamber 26, for the frozen meat may be provided, as usual, at the other ends of the chilling chambers 1, 2, 3, 4, and doors 27 may be provided which give access to such storage chamber 26, from each of said chilling chambers 1, 2, 3, 4. An external door or doors 28, are provided for the removal of the carcasses from said storage chamber or room 26.

Inspection doors 29 are provided in suitable positions in the structure for giving access to the suction and outlet or delivery passages 12, 13 respectively, and the air-cooling chamber 10.

In the operation of the plant shown and described, the carcasses or animal substances are taken from the "hanging hall" or receiving room 23, and placed within one or other of the chilling chambers 1, 2, 3, 4. The entrance to the chilling chamber is then closed, and preferably tightly sealed, as I find that the more complete the vacuum established in the chamber the more effective is the process. The door or doors closing the opening or openings 15 leading from the chilling chamber to the outlet or delivery passage 13, is, or are closed, and the door or doors which close the openings or openings 14, leading from the chilling chamber to the suction passage 12 are opened. The reduction of the temperature in the chilling chamber having been commenced through the medium of the direct expansion pipe system 5, and the fan 16, set in motion, the initial chilling of the contents of the chamber is commenced. The operation of the fan 16, results in the extraction of the air from and the consequent creation of a partial vacuum in the chilling chamber, as previously described, the air so extracted by the fan 16, being drawn along the suction passage 12, and then forced through the air-cooling chamber 10 (which is meantime inoperative) and through the outlet or delivery passage 13, to and through the exit, which is provided by opening the door 21, into the open. This operation, or treatment of the meat in a partial vacuum, is continued for a period of say 12 (twelve) to 15 (fifteen) hours—more or less—depending on the temperature of the meat when it is first placed in the chilling chamber. During this time the superficial drying of the meat takes place, which prevents the escape of the nutritious contents of the meat. This completes the primary chilling under the partial vacuum. After the lapse of the stated period of time the door 21 at the exit from the outlet or delivery passage 13, is closed, and the door or doors closing the opening or openings 15, leading from the said passage 13 to the chilling chamber is or are opened. The battery of pipes 11 in the air-cooling chamber 10 is now brought into operation, and the air is then cooled by being forced by the fan 16 into contact with the said pipes 11, and thereafter through the delivery passage 13 and opening or openings 15, into the chilling chamber, to be again withdrawn or extracted through the opening or openings 14 leading from the chilling chamber into the suction passage 12. This continuous circulation of the cooled air is maintained for a period of say 12 (twelve) to 15 (fifteen) hours, more or less. This completes the secondary chilling by the cold air circulation. The direct expansion system 5, in the chilling chamber is kept in operation during this secondary chilling period, so as to prevent the thawing of any of the vapours which have been condensed or frozen on the direct expansion system pipes 5, in the chilling chamber. The opening or openings 14, leading from the suction passage 12, to the one end of the chilling chamber and the opening or openings 15, leading from the delivery passage 13, to the other end of the chilling chamber are now closed by means of their respective doors, and the final operation of the freezing of the contents of the chilling chamber is now commenced through the medium of the direct expansion pipe system, in the chamber, and continued for a period of say 6 (six) days, more or less.

It is obvious that the three operations of initial or primary chilling by the direct expansion system, the secondary chilling by the cold air circulation from the air-cooling chamber, and the final freezing by the direct expansion system, can be completely carried out in each chilling chamber independently of the others, so that by providing a sufficient number of the chilling chambers, and using them in rotation, the process can be made a practically continuous one. As the entire process is completed in one and the same chamber the repeated handling of the meat is obviated.

During the initial chilling the temperature of the chilling chamber is reduced to approximately 35° (thirty-five degrees) Fahrenheit, and during the secondary chilling the temperature of the meat is reduced to approximately 28° (twenty-eight degrees) Fahrenheit.

Instead of effecting the chilling and freezing by the direct expansion system as above explained, it may be accomplished by brine circulation.

What I claim as my invention, and desire to protect by Letters Patent is:—

1. Apparatus for chilling and freezing animal substances, comprising a chamber, means for withdrawing air from the chamber, means for cooling the air withdrawn from the chamber, means for controlling the flow of the withdrawn air to either pass it to the atmosphere or to return it to the chamber, and means in the chamber for freezing the animal substances.

2. Apparatus for chilling and freezing animal substances, comprising a chamber, a refrigerating system in the chamber, a conduit interconnecting opposite ends of the chamber, means in the conduit for causing a circulation of the air of the chamber through the conduit, means for severing at will communication between the chamber and either or both ends of the conduit, means for connecting the conduit with the atmosphere and means in the conduit for cooling the air passing therethrough.

3. Apparatus for chilling and freezing animal substances, comprising a plurality of chambers, a conduit and means for independently connecting opposite ends of each chamber to opposite ends of the conduit, means in the conduit for causing circulation of air of the chambers through the conduit, means for connecting the conduit with the atmosphere, means in the conduit for cooling the air flowing therethrough and a refrigerating system in each chamber.

In testimony whereof I have signed my name to this specification in the presence of two subscribing witnesses.

JOHN COUTTS SHAW.

Witnesses:
L. A. GINSBERG,
CHAS. O. VENDAL.